(12) United States Patent
Ishida

(10) Patent No.: US 12,258,213 B2
(45) Date of Patent: Mar. 25, 2025

(54) CONVEYANCE SYSTEM, CONVEYING METHOD, AND PROGRAM

(71) Applicant: TOYOTA JIDOSHA KABUSHIKI KAISHA, Toyota (JP)

(72) Inventor: Yutaro Ishida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 652 days.

(21) Appl. No.: 17/565,521

(22) Filed: Dec. 30, 2021

(65) Prior Publication Data

US 2022/0267092 A1     Aug. 25, 2022

(30) Foreign Application Priority Data

Feb. 22, 2021   (JP) .................................. 2021-026156

(51) Int. Cl.
*B65G 1/137*       (2006.01)
*G05D 1/00*        (2006.01)

(52) U.S. Cl.
CPC ............... *B65G 1/137* (2013.01); *G05D 1/02* (2013.01)

(58) Field of Classification Search
CPC ................................... B65G 1/137; G05D 1/02
See application file for complete search history.

(56) References Cited

U.S. PATENT DOCUMENTS 11,407,590 B1 *   8/2022   Pajevic ................ G05D 1/0217
11,459,221 B2 *  10/2022   Levasseur ............... B66F 9/142
2018/0086561 A1 *  3/2018  Stubbs .................... B65G 1/137

FOREIGN PATENT DOCUMENTS

JP         6247796 B2    11/2017

* cited by examiner

*Primary Examiner* — Kyle O Logan
(74) *Attorney, Agent, or Firm* — SoraIP, Inc.

(57) ABSTRACT

A conveyance system includes a conveyance robot that conveys a carried item adjacent to an obstacle, by approaching the carried item in a predetermined control target direction, getting into under the carried item, and moving when the carried item is lifted by an elevating device. The conveyance system obtains information on a control error indicating deflection in a yawing direction of a moving direction of the conveyance robot relative to the control target direction, when the conveyance robot gets into under the carried item, determines whether the carried item interferes with the obstacle, when the conveyance robot starts moving in the condition where the carried item is lifted, based on the obtained control error information, and corrects the control target direction used when the conveyance robot gets into under the carried item, to reduce the control error, when determining that the carried item interferes with the obstacle.

2 Claims, 10 Drawing Sheets

CONVEYANCE SYSTEM, CONVEYING METHOD, AND PROGRAM

CROSS-REFERENCE TO RELATED APPLICATION

This application claims priority to Japanese Patent Application No. 2021-026156 filed on Feb. 22, 2021, incorporated herein by reference in its entirety.

BACKGROUND

1. Technical Field

The disclosure relates to a conveyance system that conveys a carried item, a conveying method, and a program.

2. Description of Related Art

A conveyance system is known which includes a conveyance robot that conveys a carried item, by getting into under the carried item, and moving in a condition where the carried item is lifted by an elevating device (see, for example, Japanese Patent No. 6247796).

SUMMARY

When the conveyance robot gets into under the carried item, there may arise a control error by which the moving direction of the conveyance robot deflects in the yawing direction relative to a predetermined control target direction. Due to the control error, the carried item may interfere with an obstacle when the conveyance robot starts moving in the condition where the carried item is lifted by the elevating device.

The disclosure provides a conveyance system that can curb interference between a carried item and an obstacle due to a control error of a conveyance robot, and also provides a conveying method, and a program.

A first aspect of the disclosure is concerned with a conveyance system including a conveyance robot configured to convey a carried item adjacent to an obstacle, by approaching the carried item in a predetermined control target direction relative to the carried item, getting into under the carried item, and moving in a condition in which the carried item is lifted by an elevating device. The conveyance system includes an error obtaining unit that obtains information on a control error indicating deflection in a yawing direction of a direction of movement of the conveyance robot relative to the predetermined control target direction, when the conveyance robot gets into under the carried item, a determining unit that determines whether the carried item interferes with the obstacle, when the conveyance robot starts moving in the condition in which the carried item is lifted by the elevating device, based on the information on the control error obtained by the error obtaining unit, and a correcting unit that corrects the predetermined control target direction used when the conveyance robot gets into under the carried item, to reduce the control error, when the determining unit determines that the carried item interferes with the obstacle. In the first aspect, the correcting unit may correct the predetermined control target direction, to reduce the control error, when the predetermined control target direction used when the conveyance robot gets into under the carried item is in parallel with the obstacle. In the first aspect, the determining unit may determine that the carried item interferes with the obstacle, when the determining unit determines that the carried item and the obstacle get closer to each other when the conveyance robot starts moving in the condition in which the carried item is lifted by the elevating device. In the first aspect, the determining unit may determine that the carried item interferes with the obstacle, when the determining unit determines that the carried item and the obstacle get closer to each other when the conveyance robot starts moving in the condition in which the carried item is lifted by the elevating device, and a clearance between the carried item and the obstacle is equal to or smaller than a predetermined value. A second aspect of the disclosure is concerned with a method of conveying a carried item adjacent to an obstacle, by causing a conveyance robot to approach the carried item in a predetermined control target direction relative to the carried item, get into under the carried item, and move in a condition in which the carried item is lifted by an elevating device. The method includes a step of obtaining information on a control error indicating deflection in a yawing direction of a direction of movement of the conveyance robot relative to the predetermined control target direction, when the conveyance robot gets into under the carried item, a step of determining whether the carried item interferes with the obstacle, when the conveyance robot starts moving in the condition in which the carried item is lifted by the elevating device, based on the obtained information on the control error, and a step of correcting the predetermined control target direction used when the conveyance robot gets into under the carried item, to reduce the control error, when it is determined that the carried item interferes with the obstacle. A third aspect of the disclosure is concerned with a program for conveying a carried item adjacent to an obstacle, by causing a conveyance robot to approach the carried item in a predetermined control target direction relative to the carried item, get into under the carried item, and move in a condition in which the carried item is lifted by an elevating device. The program causes a computer to execute the steps of: obtaining information on a control error indicating deflection in a yawing direction of a direction of movement of the conveyance robot relative to the predetermined control target direction, when the conveyance robot gets into under the carried item, determining whether the carried item interferes with the obstacle, when the conveyance robot starts moving in the condition in which the carried item is lifted by the elevating device, based on the obtained information on the control error, and correcting the predetermined control target direction used when the conveyance robot gets into under the carried item, to reduce the control error, when it is determined that the carried item interferes with the obstacle.

According to the disclosure, the conveyance system that can curb interference between the carried item and the obstacle due to the control error of the conveyance robot, the conveying method, and the program can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

While this disclosure will be described through one embodiment of the disclosure, the disclosure defined in any of the appended claims is not limited to the embodiment as described below. For explicit explanation, the following description and the drawings are subjected to omission or simplification as appropriate. In each drawing, the same reference signs are assigned to the same elements, and repeated description of the elements is omitted as needed.

Figure 1:
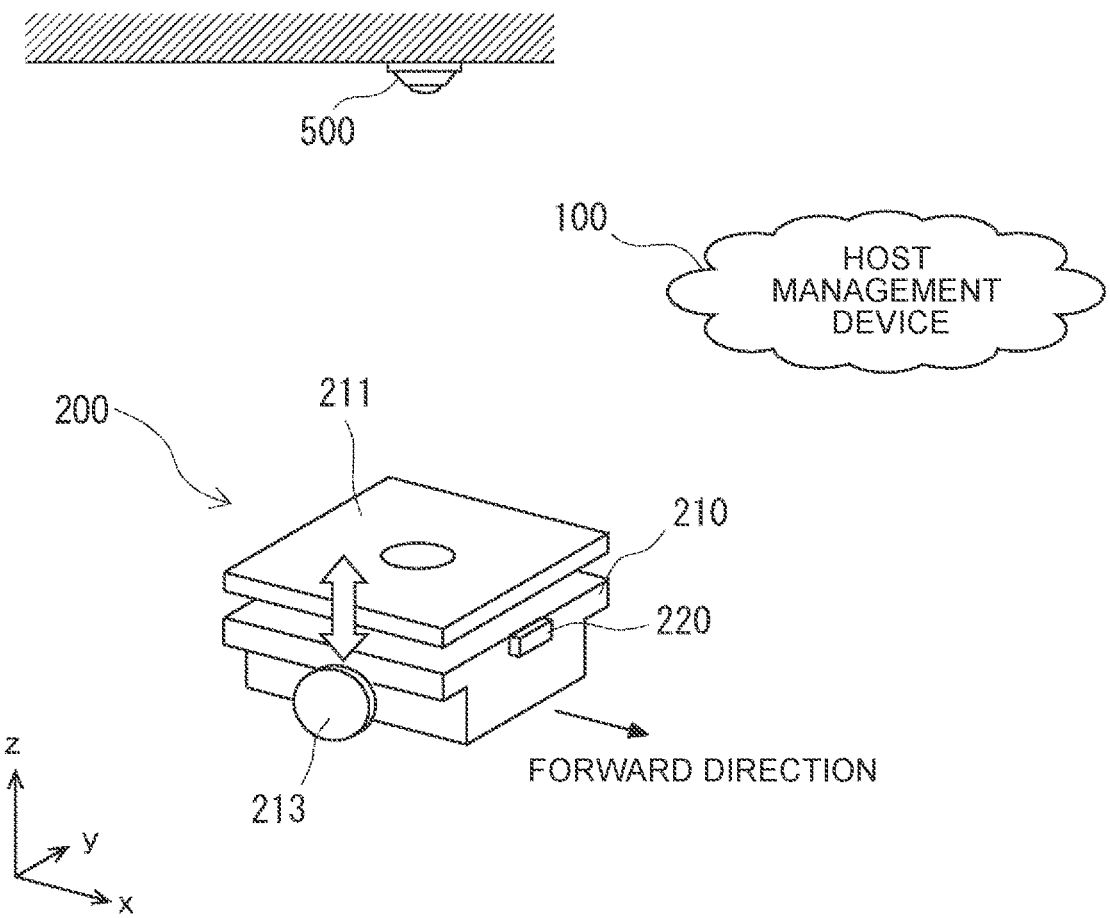
FIG. 1 is a schematic view of a conveyance system according to one embodiment.

FIG. 1 is a schematic view of a conveyance system according to the embodiment. Referring to FIG. 1, the conveyance system 1 according to the embodiment will be described. In the conveyance system 1, a conveyance robot 200 that autonomously moves in a predetermined region conveys a carried item that is to be conveyed.

The conveyance system 1 shown in FIG. 1 is one example of the conveyance system. For example, the conveyance system 1 can convey a carrier shelf on which dishes, drugs, medical appliances, etc. are placed, to a preset location, in a facility, such as a hospital. The conveyance system 1 has, as main constituent elements, a host management device 100, conveyance robot 200, and environment camera 500.

The host management device 100 grasps conditions in the facility, using the environment camera 500, etc., and controls the conveyance robot 200, to convey the carried item. The host management device 100 may be provided in the facility in which the conveyance robot 200 is in operation, or may be installed in a location away from the facility. The host management device 100 has a communication function, and is able to communicate with equipment, such as the conveyance robot 200 and the environment camera 500, in the facility.

The conveyance robot 200 is configured as an autonomous mobile robot that moves on a floor of a hospital, for example. The conveyance robot 200 can convey a carried item, such as a carrier shelf, from a given location (a point of departure) to another location (destination).

The configuration of the conveyance robot 200 will be described in detail. The conveyance robot 200 shown in FIG. 1 is one example of an autonomous mobile robot, and may take another form.

The conveyance robot 200 according to this embodiment has a robot main body 210 in the shape of a generally rectangular parallelepiped, a distance sensor 220 attached to the front face of the robot main body 210, an elevating unit 230 provided on the top face of the robot main body 210, and wheels 213 attached to the right and left side faces of the robot main body 210.

A wheel driving unit that drives the wheels 213 is provided in the robot main body 210. While a pair of wheels 213 is attached to the right and left side faces of the robot main body 210, the arrangement of the wheels 213 is not limited to this. For example, two pairs of wheels may be attached to the right and left side faces of the robot main body 210, or a pair of wheels and one auxiliary wheel may be attached to the right and left side faces of the robot main body 210.

The distance sensor 220 is in the form of, for example, a laser sensor, ultrasonic sensor, camera, or the like. The distance sensor 220 obtains distance information of an obstacle and a carried item present around the conveyance robot 200. In this connection, the robot main body 210 may be provided with two or more distance sensors 220, and the locations at which the distance sensors 220 are provided may be selected as desired.

The elevating unit 230 is one specific example of the elevating device. The elevating unit 230 generally refers to an arrangement that goes up and down relative to the robot main body 210, and consists of a plate 211 on which the carried item is placed, an elevating mechanism that raises and lowers the plate 211, etc.

The conveyance robot 200 proceeds toward the carried item in a predetermined control target direction (which will be called "control target direction"), and gets into under the carried item, based on the distance information of the carried item obtained by the distance sensor 220, and route plan information that will be described later. Then, after getting into under the carried item, the conveyance robot 200 lifts the carried item by means of the elevating unit 230, and conveys the carried item by moving in a condition where the item is lifted up.

Figure 2:
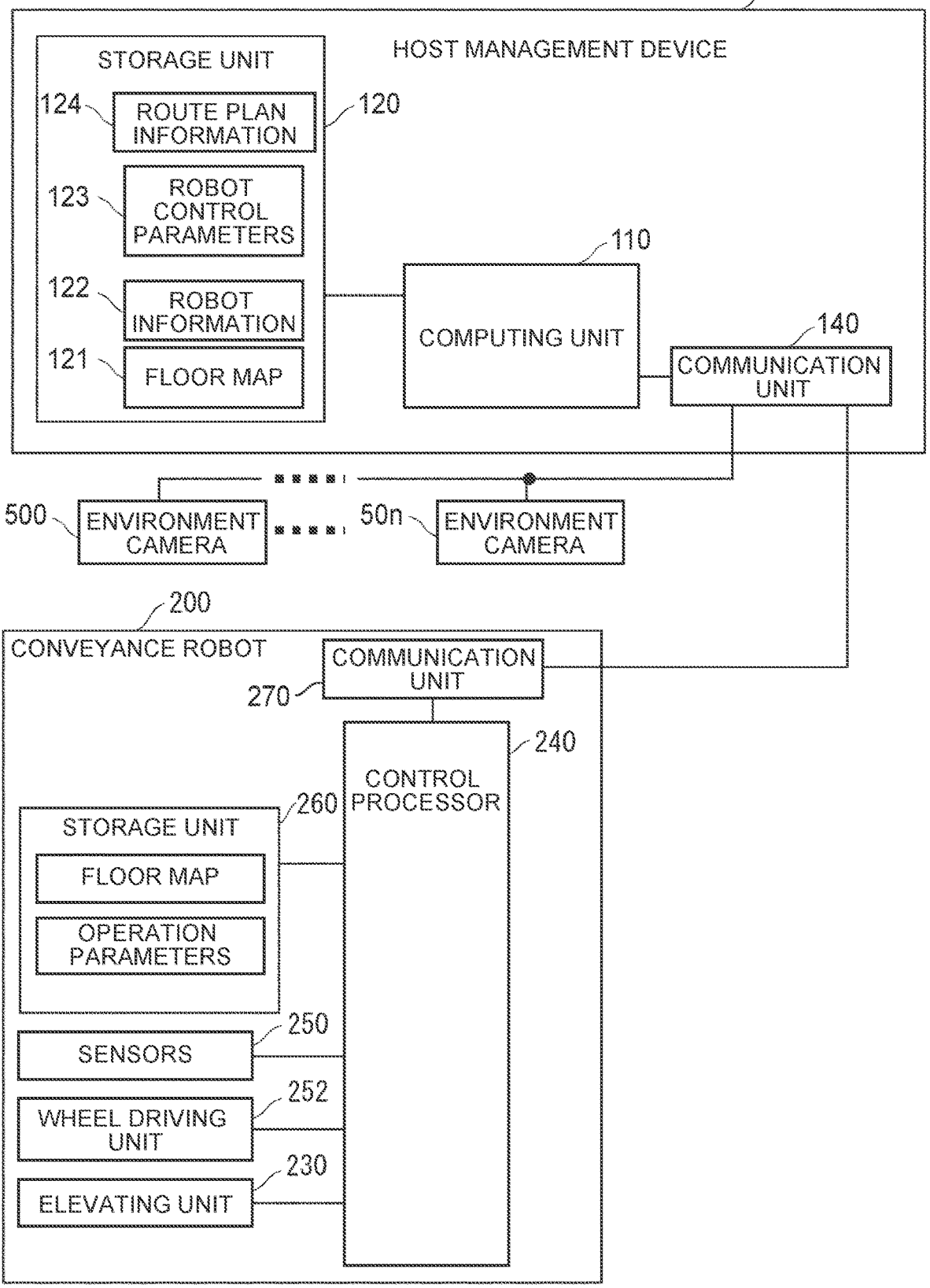
FIG. 2 is a block diagram of the conveyance system according to the embodiment.

Next, the system configuration of the conveyance system 1 will be described in detail with reference to FIG. 2. FIG. 2 is a block diagram of the conveyance system 1 according to the embodiment. The conveyance system 1 has the host management device 100, conveyance robot 200, and environment cameras 501 to 50n.

Initially, the host management device 100 will be described. The host management device 100 has a computing unit 110, storage unit 120, and communication unit 140. The storage unit 120 stores a floor map 121, robot information 122, robot control parameters 123, and route plan information 124.

The computing unit 110 is a processor, such as a central processing unit (CPU), that can execute programs, for example, and is able to perform processing as described later, via a load conveyance program.

The computing unit 110 gives an operation command to the conveyance robot 200, according to a preset schedule. At this time, the computing unit 110 issues the operation command to the conveyance robot 200, via the communication unit 140.

When issuing the operation command, the computing unit 110 grasps the point of departure and destination of the conveyance robot 200, referring to the floor map 121, and transmits a movement procedure to the conveyance robot 200, referring to the route plan information 124. Also, the computing unit 110 determines operating conditions of the computing unit 110, referring to the robot information 122 and the robot control parameters 123, and transmits the operating conditions thus determined, to the conveyance robot 200, via the communication unit 140.

As one of the operating conditions, the computing unit 110 sets the control target direction used when the conveyance robot 200 gets into under the carried item, for example. The computing unit 110 sends the set control target direction to the conveyance robot 200, via the communication unit 140.

The communication unit 140 is an interface that is communicably connected to the conveyance robot 200, and consists of a circuit, etc., that modulates or demodulates signals transmitted via an antenna, for example. The communication unit 140 is connected to the computing unit 110, and supplies a given signal received from the conveyance robot 200 via wireless communications, to the computing unit 110. The communication unit 140 sends a given signal received from the computing unit 110, to the conveyance robot 200. The communication unit 140 is also configured to be able to wirelessly communicate with the environment cameras 501 to 50n.

Next, the conveyance robot 200 will be described. The conveyance robot 200 has a control processor 240, sensors 250, a wheel driving unit 252, storage unit 260, and communication unit 270.

The control processor 240, which is an information processing unit having a processor, such as a CPU, obtains information from respective components of the conveyance robot 200, and sends commands to the respective components. The control processor 240 controls operation of the wheel driving unit 252 and the elevating unit 230.

The sensors 250 generally refer to various sensors of the conveyance robot 200. The sensors 250 include the distance sensor 220, an attitude sensor, a rotary encoder, and so forth. The sensors 250 are connected to the control processor 240, and supply detected signals to the control processor 240.

The wheel driving unit 252 includes a motor driver, etc. for driving motors of the wheels 213. The elevating unit 230 includes a motor driver, etc. for driving a motor of the elevating mechanism. The wheel driving unit 252 and the elevating unit 230 are connected to the control processor 240, and are driven in response to commands from the control processor 240.

The storage unit 260 includes a non-volatile memory, and stores a floor map and operation parameters. The floor map is a database needed for autonomous movement of the conveyance robot 200, and includes information that is identical with at least a part of the floor map stored in the storage unit 120 of the host management device 100. The floor map may include position information of an obstacle and a carried item. The operation parameters include the control target direction transmitted from the computing unit 110 of the host management device 100.

For example, the conveyance robot 200 conveys a carried item adjacent to an obstacle. The carried item adjacent to the obstacle refers to not only the carried item that is in contact with the obstacle, but also the carried item that is not in contact with the obstacle but is located in the vicinity of the obstacle. One example of the carried item adjacent to the obstacle is a carried item, such as a carrier shelf, that is placed against a wall.

The control processor 240 controls the wheel driving unit 252, based on the distance information of the obstacle detected by the distance sensor 220, and the distance information of the carried item adjacent to the obstacle, so that the conveyance robot 200 gets into under the carried item.

The control processor 240 may control the wheel driving unit 252, based on the position information of the obstacle and the carried item in the floor map 121, so that the conveyance robot 200 gets into under the carried item.

Further, the control processor 240 may control the wheel driving unit 252, based on image information of the obstacle and the carried item captured by the environment camera 500, so that the robot main body 210 gets into under the carried item.

Figure 3:
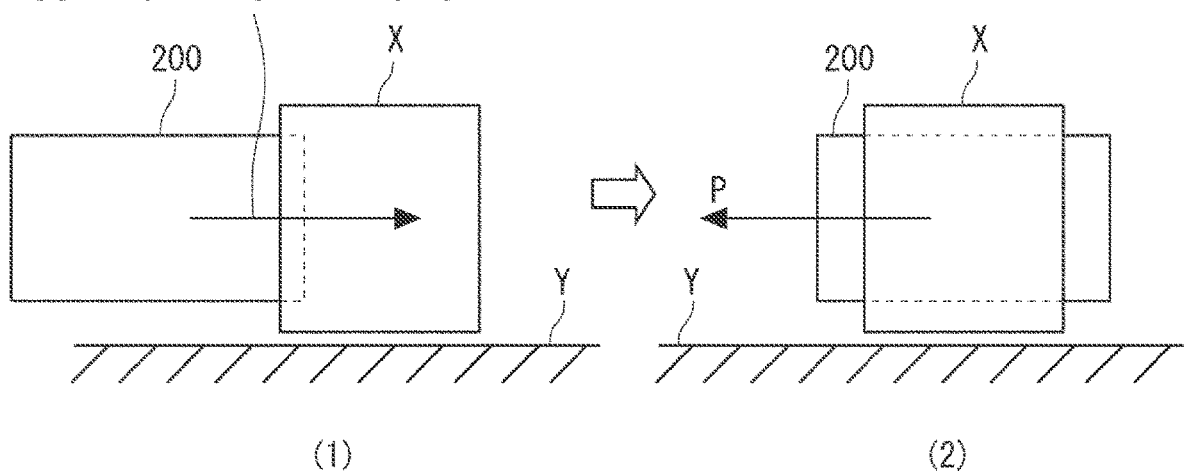
FIG. 3 is a view showing conditions in which a robot main body gets into under a carried item in a control target direction.

As shown in (1) of FIG. 3, the control processor 240 controls the wheel driving unit 252, based on the route plan information 124, and the distance information of the carried item X adjacent to the obstacle Y obtained by the distance sensor 220, so that the conveyance robot 200 approaches the carried item X in the control target direction, and gets into under the carried item X. Where the carried item X is rectangular as viewed from above, for example, the control target direction is perpendicular to one side of the rectangular item X.

When the control processor 240 determines that the conveyance robot 200 is located under the carried item X adjacent to the obstacle Y, based on the distance information of the carried item X detected by the distance sensor 220, the control processor 240 controls the elevating unit 230, to lift the carried item X. Then, as shown in (2) of FIG. 3, the control processor 240 controls the wheel driving unit 252 so that the conveyance robot 200 moves in the direction P in a condition where the carried item X is lifted by the elevating unit 230, and conveys the carried item X to the destination.

In the meantime, when a conveyance robot gets into under a carried item, there may arise a control error by which the direction P of movement deflects in the yawing direction, relative to the control target direction. Conventionally, when the conveyance robot starts moving in a condition where the carried item is lifted by the elevating unit, the carried item and the obstacle may interfere with each other, due to the control error.

Figure 4:
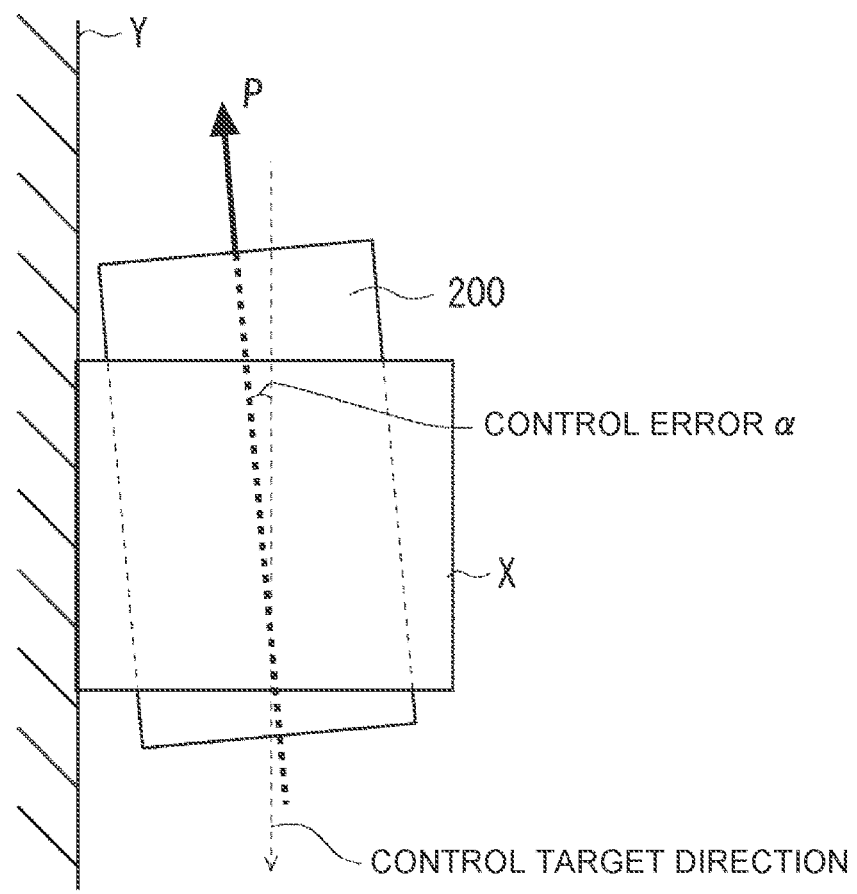
FIG. 4 is a view showing a control error that arises when a conveyance robot gets into under the carried item.

For example, as shown in FIG. 4, when the conveyance robot 200 gets into under the carried item X, there may arise a control error α by which the direction P of movement deflects relative to the control target direction in the counterclockwise direction. In the following description, the direction of deflection is positive when the direction P of movement deflects relative to the control target direction in the clockwise direction, and the direction of deflection is negative when the direction P of movement deflects relative to the control target direction in the counterclockwise direction.

In this case, when the conveyance robot 200 starts moving in the direction P of the arrow in a condition where the carried item is lifted by the elevating unit 230, the conveyance robot 200 moves in such a direction as to make the carried item X and the obstacle Y closer to each other; as a result, the carried item X and the obstacle Y interfere with each other. In FIG. 4, the deflection angle of the control error α is expressed such that it looks larger than in reality, for the sake of easier understanding.

Also, when the control target direction used when the conveyance robot 200 gets into under the carried item X is in parallel with the obstacle Y, as shown in FIG. 4, the carried item X interferes with the obstacle Y due to the control error α, when the conveyance robot 200 starts moving, as described above.

On the other hand, when the conveyance system 1 according to this embodiment determines that the carried item X interferes with the obstacle Y, it corrects the control target direction used when the conveyance robot 200 gets into under the carried item X, so as to reduce or eliminate the control error α. Thus, the control target direction is corrected to reduce or eliminate the control error α, thereby to curb the interference between the carried item X and the obstacle Y due to the control error α.

Figure 5:
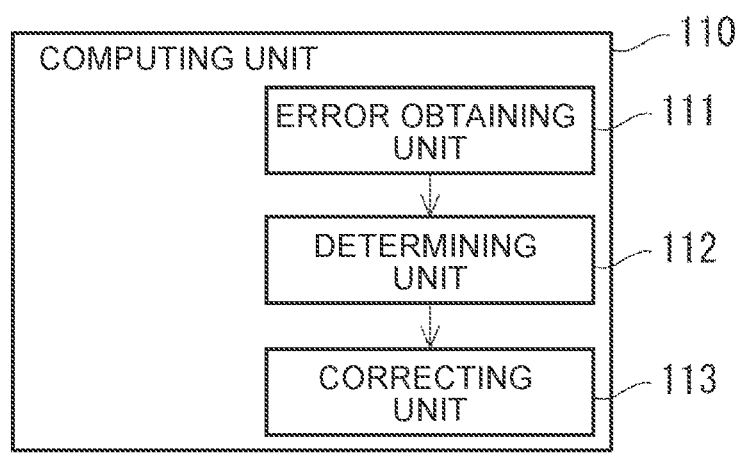
FIG. 5 is a block diagram schematically showing the system configuration of a computing unit according to the embodiment.

FIG. 5 is a block diagram schematically showing the system configuration of the computing unit according to this embodiment. The computing unit 110 according to this embodiment has an error obtaining unit 111 that obtains a control error α of the conveyance robot 200, a determining unit 112 that determines whether a carried item X interferes with an obstacle Y, and a correcting unit 113 that corrects the control target direction.

The error obtaining unit 111 obtains information on the control error α in the movement direction P relative to the control target direction when the conveyance robot 200 gets into under the carried item X.

The control error α is a value determined by the characteristics of the mechanisms of respective parts of the conveyance robot 200 and the sensors, and can be empirically obtained in advance. The information on the control error α includes the deflection angle in the yawing direction and the positive/negative direction relative to the control target direction.

The information on the control error α of the conveyance robot 200 may be set in advance in the robot information 122 in the storage unit 120, for example. The error obtaining unit 111 obtains information on the control error α relative to the control target direction, from the robot information 122 in the storage unit 120. The information on the control error α may be set as an operation parameter in the storage unit 260 of the conveyance robot 200. In this case, the error obtaining unit 111 may obtain the information on the control error α from the storage unit 260 of the conveyance robot 200. The error obtaining unit 111 outputs the obtained information on the control error α to the determining unit 112.

The determining unit 112 determines whether the carried item X interferes with the obstacle Y, when the conveyance robot 200 starts moving in a condition where the carried item X is lifted by the elevating unit 230, based on the floor map 121 and route plan information 124 stored in the storage unit 120, and the information on the control error α obtained by the error obtaining unit 111.

For example, the determining unit 112 determines that the carried item X interferes with the obstacle Y, in the case where it determines that the direction P of movement deflects by the control error α in the negative direction, and the carried item X and the obstacle Y get closer to each other, as shown in FIG. 4, when the conveyance robot 200 starts moving in the direction P in the condition where the carried item X is lifted by the elevating unit 230.

Figure 6:
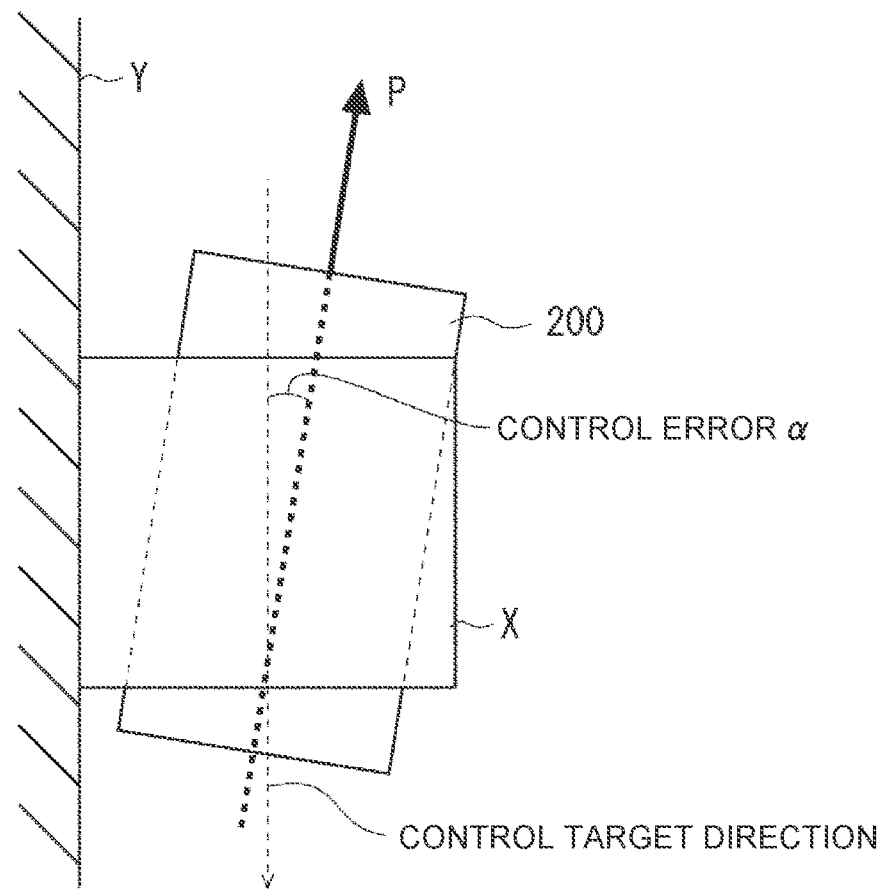
FIG. 6 is a view showing a condition in which the direction of movement of the conveyance robot deflects by a control error in the positive direction.

On the other hand, the determining unit 112 determines that the carried item X does not interfere with the obstacle Y, in the case where it determines that the direction P of movement deflects by the control error α in the positive direction, and the carried item X and the obstacle Y get away from each other, as shown in FIG. 6, when the conveyance robot 200 starts moving in the direction P in the condition where the carried item X is lifted by the elevating unit 230.

Figure 7:
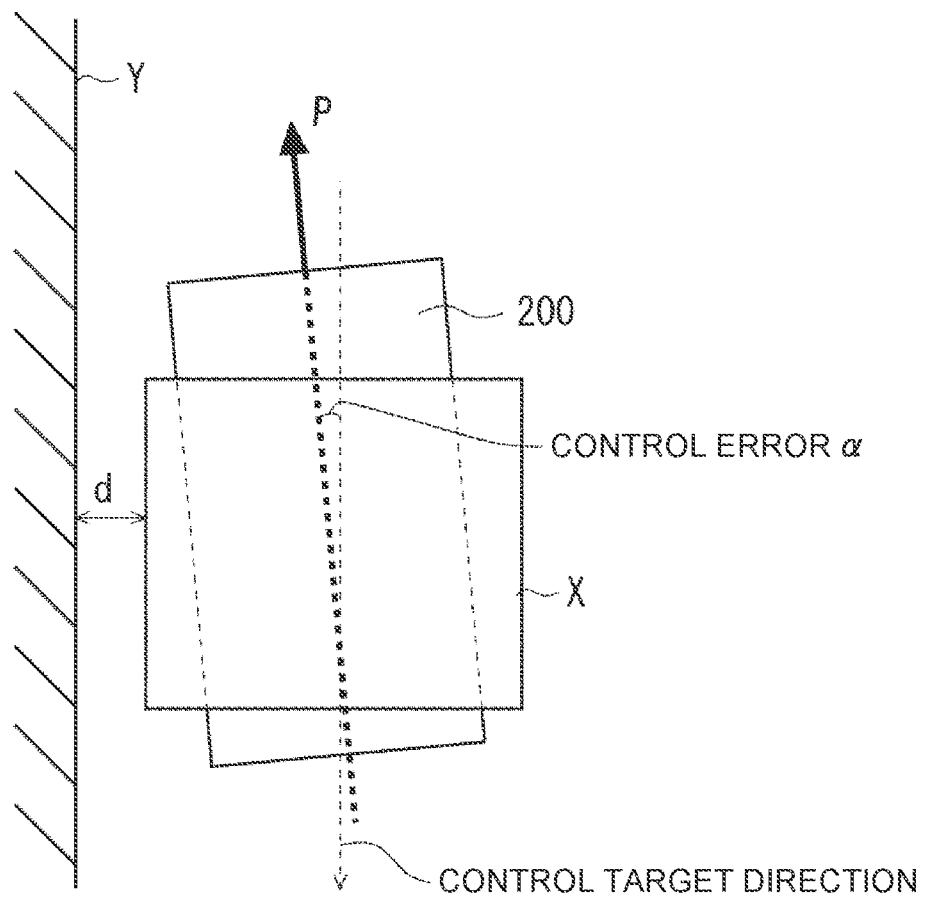
FIG. 7 is a view showing the case where there is a clearance between a carried item and an obstacle.

In this connection, when there is a clearance "d" between the carried item X and the obstacle Y, as shown in FIG. 7, for example, the determining unit 112 may determine the interference between the carried item X and the obstacle Y, in view of the size of the clearance "d" between the carried item X and the obstacle Y, as well as the above determination that the carried item X and the obstacle Y get closer to each other when the conveyance robot 200 starts moving, as described above.

This is because, if the size of clearance "d" between the carried item X and the obstacle Y is equal to or larger than a certain size, the conveyance robot 200 is able to move while avoiding interference between the carried item X and the obstacle Y, owing to the clearance d, even when the carried item X and the obstacle Y get closer to each other upon start of movement of the conveyance robot 200.

More specifically, the determining unit 112 determines that the carried item X interferes with the obstacle Y, in the case where it determines that the carried item X and the obstacle Y get closer to each other, when the conveyance robot 200 starts moving in the condition where the carried item X is lifted by the elevating unit 230, and it also determines that the clearance "d" between the carried item X and the obstacle Y is equal to or smaller than a predetermined value. Thus, the interference can be determined with higher accuracy, according to the size of the clearance "d" between the carried item X and the obstacle Y.

The optimum value empirically obtained in advance may be set as the predetermined value in the determining unit 112. Also, the determining unit 112 can calculate the clearance "d" between the carried item X and the obstacle Y, based on position information of the floor map stored in the storage unit 260, or the distance information of the carried item X and the obstacle Y obtained by the distance sensor 220.

When the determining unit 112 determines that the carried item X interferes with the obstacle Y, as described above, it outputs an interference signal indicating the determination, to the correcting unit 113.

When the determining unit 112 determines that the carried item X interferes with the obstacle Y, the correcting unit 113 corrects the control target direction used when the conveyance robot 200 gets into under the carried item X, so as to reduce or eliminate the control error α. Thus, the interference between the carried item X and the obstacle Y due to the control error α can be curbed, by correcting the control target direction so as to reduce or eliminate the control error α.

For example, when the determining unit 112 determines, based on the information on the control error α obtained by the error obtaining unit 111, that the direction P of movement of the conveyance robot 200 deflects by the control error α in the negative direction, as shown in FIG. 4, the correcting unit 113 corrects the control target direction to the positive direction, so as to reduce or eliminate the control error α.

For example, the amount of correction of the control target direction is set to an amount that completely cancels the deflection of the control error α. However, the correction amount is not limited to this amount, but may be larger or smaller than it. Also, the optimum value empirically obtained may be set in advance in the correcting unit 113, as the correction amount of the control target direction.

The correcting unit 113 of the computing unit 110 sends the control target direction corrected as described above (which will be called "corrected control target direction"), to the conveyance robot 200, via the communication unit 140. The conveyance robot 200 proceeds in the corrected control target direction transmitted from the correcting unit 113, relative to the carried item X, and gets into under the carried item X.

Figure 8:
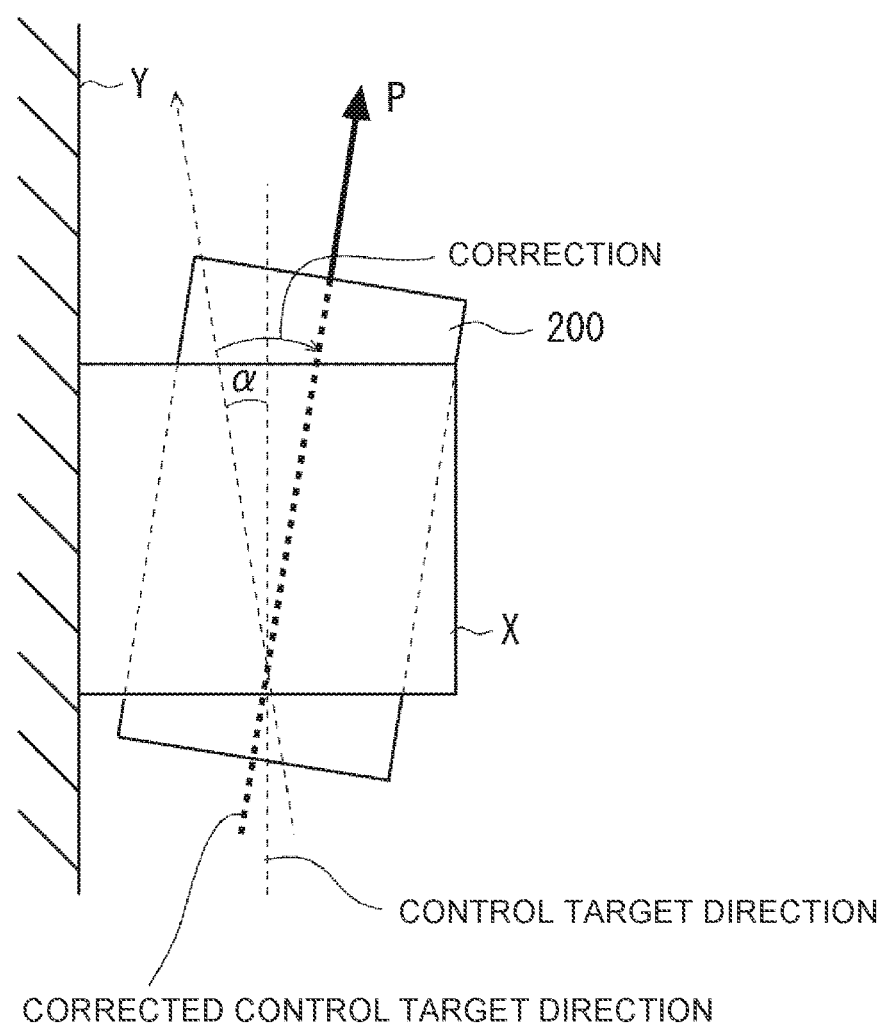
FIG. 8 is a view showing a condition in which the control target direction is corrected in the positive direction.

Conventionally, there may arise a control error α by which the direction P of movement deflects in the negative direction relative to the control target direction when the conveyance robot 200 gets into under the carried item X, as shown in FIG. 4 by way of example. In this situation, according to this embodiment, the correcting unit 113 corrects the control target direction to the positive direction, so as to reduce or eliminate the control error α. In this case, the conveyance robot 200 gets into under the carried item X in the corrected control target direction, as shown in FIG. 8 by way of example. Accordingly, after getting into under the carried item X, the conveyance robot 200 causes the elevating unit 230 to lift the carried item X, and moves in the direction P in a condition where the carried item X is lifted up. At this time, the carried item X and the obstacle Y are spaced apart from each other, and do not interfere with each other.

Figure 9:
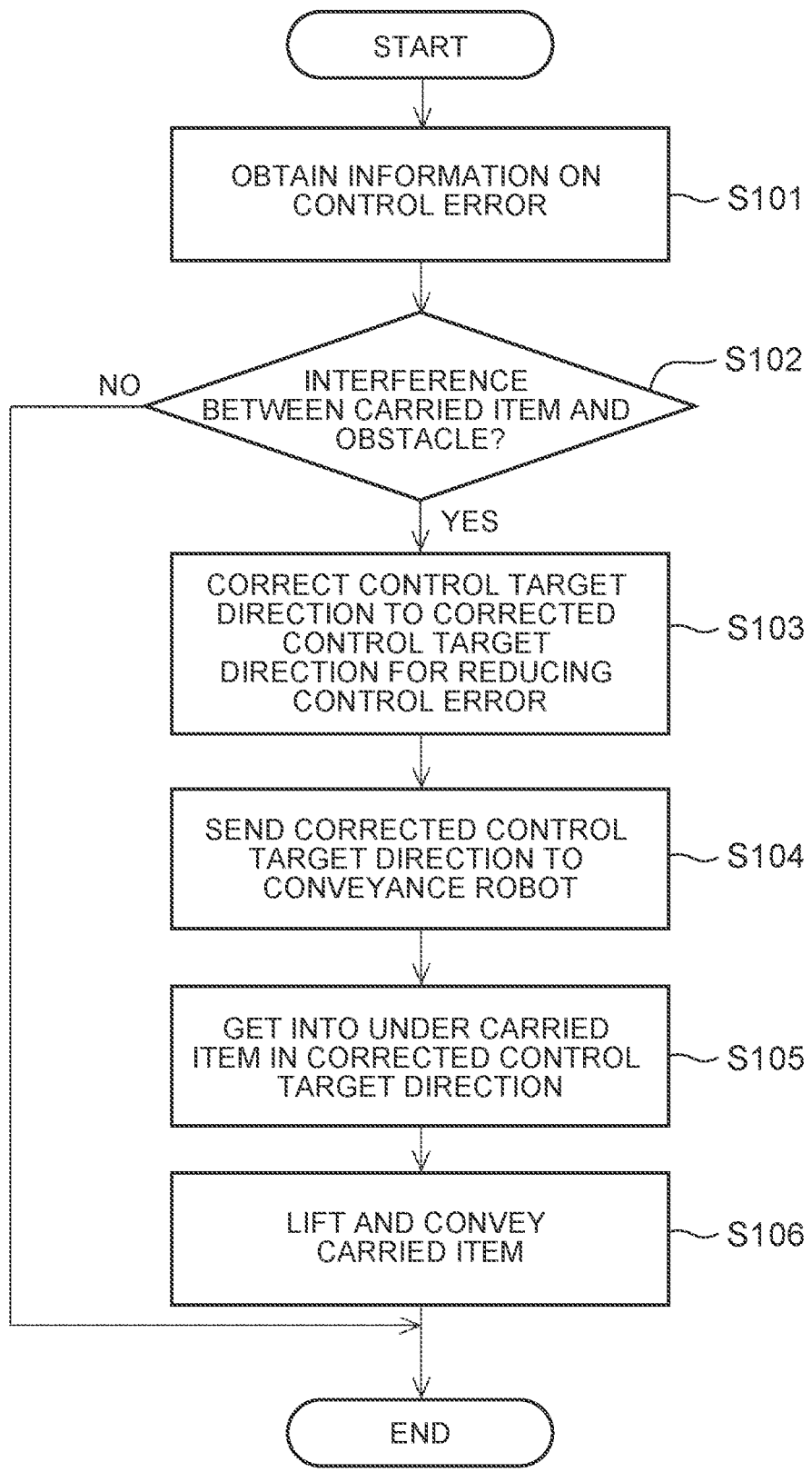
FIG. 9 is a flowchart illustrating the flow of a conveying method according to the embodiment.

Subsequently, a conveying method according to this embodiment will be described. FIG. 9 is a flowchart illustrating the flow of the conveying method according to the embodiment.

The error obtaining unit 111 of the computing unit 110 obtains information on the control error α in the direction P of movement relative to the control target direction when the conveyance robot 200 gets into under the carried item X, and outputs the obtained information on the control error α, to the determining unit 112 (step S101).

The determining unit 112 determines whether the carried item X interferes with the obstacle Y, when the conveyance robot 200 starts moving in a condition where the carried item X is lifted by the elevating unit 230, based on the information on the control error α received from the error obtaining unit 111 (step S102).

When the determining unit 112 determines that the carried item X interferes with the obstacle Y (YES in step S102), the correcting unit 113 corrects the control target direction used when the conveyance robot 200 gets into under the carried item X, to the corrected control target direction for reducing or eliminating the control error α (step S103). On the other hand, when the determining unit 112 determines that the carried item X does not interfere with the obstacle Y (NO in step S102), the correcting unit 113 finishes this routine.

The correcting unit 113 of the computing unit 110 sends the corrected control target direction to the conveyance robot 200 via the communication unit 140 (step S104). The conveyance robot 200 proceeds in the corrected control target direction transmitted from the correcting unit 113, and gets into under the carried item X (step S105).

After getting into under the carried item X, the conveyance robot 200 causes the elevating unit 230 to lift the carried item X, and conveys the carried item X by moving it in a lifted condition (step S106).

Thus, the conveyance system 1 according to this embodiment includes the error obtaining unit 111 that obtains information on a control error indicating deflection in the yawing direction of the direction of movement relative to the control target direction when the conveyance robot 200 gets into under a carried item, the determining unit 112 that determines whether the carried item interferes with an obstacle when the conveyance robot 200 starts moving in a condition where the carried item is lifted by the elevating unit 230, based on the information on the control error obtained by the error obtaining unit 111, and the correcting unit 113 that corrects the control target direction used when the conveyance robot 200 gets into under the carried item, so as to reduce or eliminate the control error, when the determining unit 112 determines that the carried item interferes with the obstacle.

According to this embodiment, the control target direction is corrected to reduce or eliminate the control error, so that the interference between the carried item and the obstacle due to the control error can be curbed or prevented.

In the conveyance system 1 according to this embodiment, the functions provided in the host management device 100 and the conveyance robot 200 may be installed on either of the devices depending on the use. The functions of the computing unit 110, storage unit 120, etc. of the host management device 100 may be installed on the conveyance robot 200 side.

Figure 10:
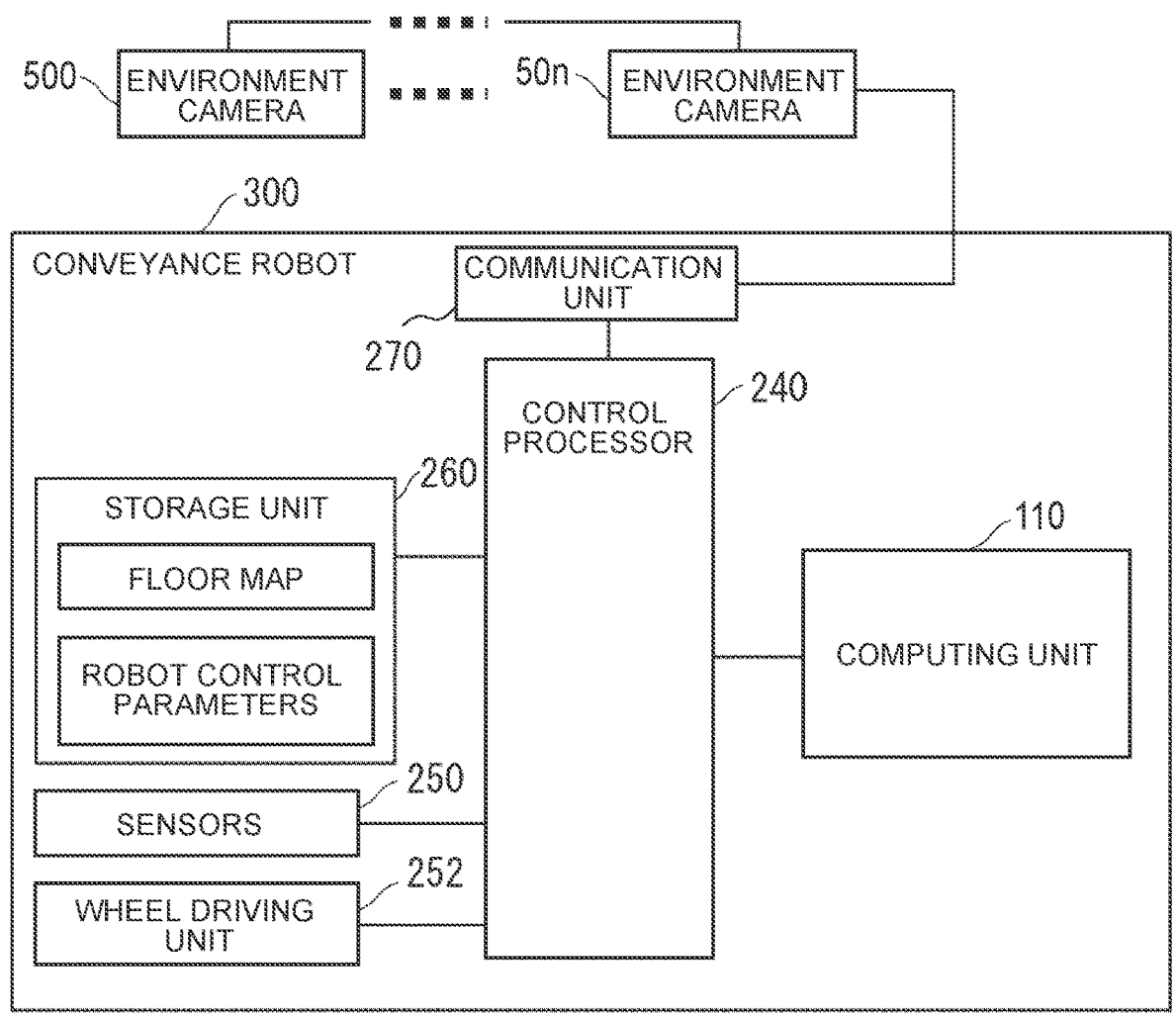
FIG. 10 is a view showing the configuration of a conveyance system that does not include a host management device.

For example, a conveyance system 10 may not include the host management device 100, as shown in FIG. 10. A conveyance robot 300 further includes the computing unit 110, in addition to the configuration of the above embodiment. Further, the conveyance system 10 may consist solely of the conveyance robot 300, without including the environment camera(s) 500.

While some embodiments of the disclosure have been described, these embodiments are merely exemplary, and are not intended to limit the scope of the disclosure. The novel embodiments can be carried out in various other forms, and may be subjected to various omissions, replacements, and changes, without departing from the principle of the disclosure. The embodiments and their modifications are included in the scope or principle of the disclosure, and included in the disclosure described in the appended claims, and equivalents thereof.

According to the disclosure, it is possible to carry out the routine shown in FIG. 9, by causing a processor to execute a computer program, for example.

The program can be stored by use of a non-transitory computer readable medium of various types, and supplied to a computer. The non-transitory computer readable medium may be selected from various types of tangible storage media. Examples of the non-transitory computer readable medium include a magnetic recording medium (e.g., a flexible disk, magnetic tape, hard disk drive), magneto-optical recording medium (e.g., a magneto-optical disk), CD-ROM (read-only memory), CD-R, CD-R/W, and semiconductor memory (e.g., a mask ROM, PROM (Programmable ROM), EPROM (Erasable PROM), flash ROM, RAM (random access memory)).

The program may be supplied to a computer via a transitory computer readable medium of various types. Examples of the transitory computer readable medium include an electric signal, optical signal, and electromagnetic wave. The transitory computer readable medium may supply the program to the computer, via a wire communication path, such as an electric wire, and an optical fiber, or a wireless communication path.

Each part of the computing unit 110 of the conveyance system 1 according to the above embodiment is not only realized by a program, but may also be partially or entirely realized by a dedicated hardware, such as an ASIC (Application Specific Integrated Circuit), or FPGA (Field-Programmable Gate Array).

What is claimed is:

1. A conveyance system comprising:
    a conveyance robot configured to convey an item located adjacent to an obstacle, by approaching the item in a predetermined control target direction relative to the item, getting under the item, lifting the item, and moving in a lifted condition, the lifted condition being a condition in which the item is lifted by the conveyance robot;
    a first processor; and
    a memory, wherein
    the conveyance robot includes
        a second processor,
        a robot main body, a first motor driver configured to drive a motor of wheels, the wheels being attached to the robot main body, and a second motor driver configured to drive a motor of a plate, the plate being attached to the robot main body and being configured to lift the item placed on the plate, the first processor is configured to:

obtain information on a control error from the memory, the information on the control error indicating deflection in a yaw direction of a direction of movement of the conveyance robot relative to the predetermined control target direction when the conveyance robot gets under the item;

determine, based on the obtained information on the control error, whether the item gets closer to the obstacle when the conveyance robot starts moving in the lifted condition;

determine whether a value of a clearance between the item and the obstacle is equal to or smaller than a predetermined value;

determine that the item interferes with the obstacle in response to a determination that the item gets closer to the obstacle when the conveyance robot starts moving in the lifted condition and a determination that the value of the clearance between the item and the obstacle is equal to or smaller than the predetermined value;

correct the predetermined control target direction used when the conveyance robot gets under the item to reduce the control error; and transmit the corrected predetermined control target direction to the second processor, and the second processor is configured to:

receive the corrected predetermined control target direction;

control the first motor driver to drive the motor of the wheels to move the conveyance robot in the corrected predetermined control target direction under the item;

control the second motor driver to drive the motor of the plate to move the plate up to lift the item; and control the first motor driver to drive the motor of the wheels to move the conveyance robot to convey the item to a destination.

2. The conveyance system according to claim 1, wherein the first processor is further configured to determine whether the predetermined control target direction used when the conveyance robot gets under the item is in parallel with the obstacle, and correct the predetermined control target direction to reduce the control error in response to a determination that the predetermined control target direction used when the conveyance robot gets under the item is in parallel with the obstacle.

\* \* \* \* \*